United States Patent
Riggs et al.

(10) Patent No.: US 10,692,227 B2
(45) Date of Patent: Jun. 23, 2020

(54) DETERMINATION OF SAMPLING MAPS FOR ALIGNMENT MEASUREMENTS BASED ON REDUCTION OF OUT OF SPECIFICATION POINTS

(71) Applicant: KLA-Tencor Corporation, Milpitas, CA (US)

(72) Inventors: Brent A. Riggs, Austin, TX (US); Onur N. Demirer, Austin, TX (US); William Pierson, Austin, TX (US)

(73) Assignee: KLA-Tencor Corporation, Milpitas, CA (US)

( * ) Notice: Subject to any disclaimer, the term of this patent is extended or adjusted under 35 U.S.C. 154(b) by 496 days.

(21) Appl. No.: 15/484,961

(22) Filed: Apr. 11, 2017

(65) Prior Publication Data
US 2018/0189964 A1    Jul. 5, 2018

Related U.S. Application Data

(60) Provisional application No. 62/442,843, filed on Jan. 5, 2017.

(51) Int. Cl.
*G06T 7/33* (2017.01)
*G06T 7/73* (2017.01)
(Continued)

(52) U.S. Cl.
CPC ............ *G06T 7/337* (2017.01); *G06F 9/00* (2013.01); *G06F 15/76* (2013.01); *G06T 7/74* (2017.01);
(Continued)

(58) Field of Classification Search
None
See application file for complete search history.

(56) References Cited

U.S. PATENT DOCUMENTS 6,429,943 B1   8/2002 Opsal et al.
7,478,019 B2   1/2009 Zangooie et al.
(Continued)

FOREIGN PATENT DOCUMENTS

JP    3287047 B2    5/2002

OTHER PUBLICATIONS

Leon, Maria del Pilar and Adomaitis, Raymond, Full Wafer Mapping and Response Surface Modeling Techniques for Thin Film Deposition Processes, The Institute for Systems Research, University of Maryland, ISR Technical Report Dec. 2008, p. 1-17 (Year: 2008).*

(Continued)

*Primary Examiner* — Roy Y Yi
(74) *Attorney, Agent, or Firm* — Suiter Swantz pc llo (57) ABSTRACT

A system for determining a sample map for alignment measurements includes a metrology tool and a controller. The controller defines a full sampling map including a plurality of measurement locations. The controller directs the metrology tool to measure alignment at each measurement location of the full sampling map for a plurality of samples to generate a reference alignment dataset, generates candidate sampling maps, each being a subset of the full sampling map. The controller may further estimate alignment as a function of location based on the two or more candidate sampling maps at each measurement location of the full sampling map, and determine a working sampling map by comparing the estimated alignment to the reference alignment dataset and selecting the candidate sampling map having a smallest number of alignment estimates exceeding a selected tolerance.

20 Claims, 6 Drawing Sheets

(51) Int. Cl.
*G06F 15/76* (2006.01)
*G06F 9/00* (2006.01)
*G06T 7/00* (2017.01)

(52) U.S. Cl.
CPC .... *G06T 7/001* (2013.01); *G06T 2207/10016* (2013.01); *G06T 2207/30108* (2013.01)

(56) References Cited

U.S. PATENT DOCUMENTS

| | | | |
|---|---|---|---|
| 9,291,554 B2 | 3/2016 | Kuznetsov et al. | |
| 2005/0048741 A1* | 3/2005 | Phan | G03F 7/70625 |
| | | | 438/462 |
| 2006/0040191 A1 | 2/2006 | Okita | |
| 2009/0021723 A1 | 1/2009 | De Lega | |
| 2011/0128520 A1 | 6/2011 | Van Bilsen et al. | |
| 2014/0172394 A1 | 6/2014 | Kuznetsov et al. | |
| 2014/0278213 A1* | 9/2014 | Hsieh | G03F 7/70633 |
| | | | 702/150 |
| 2015/0204664 A1 | 7/2015 | Bringholtz et al. | |
| 2016/0329229 A1 | 11/2016 | Sun et al. | |

OTHER PUBLICATIONS

Vincent, Galarza, Khargonekar, Adaptive Estimation Using Multiple Models and Neural Networks, IFAC Artificial Intelligence in Real-Time Control, 1998, p. 149-154 (Year: 1998).*

International Search Report dated Apr. 26, 2018 for PCT/US2018/012245.

Lokesh Subramany et al., Advanced overlay: sampling and modeling for optimized run-to-run control, Proc. SPIE 9778, Metrology, Inspection, and Process Control for Microlithography XXX, 97782K, Mar. 18, 2016, 10 pages.

Woong Jae Chung et al., Run Time Scanner Data Analysis for HVM Lithography Process Monitoring and Stability Control, Prov of SPIE, vol. 9050, 90502J, Metrology, Inspection, and Process Control for Microlithography XXVIII, Apr. 2017, 8 pages.

Myungjun Lee et al., Quantifying imaging performance bounds of extreme dipole illumination in high NA optical lithography, Proc. SPIE 9985, Photomask Technology 2016, 99850X, Oct. 3, 2016, 16 pages.

\* cited by examiner

DETERMINATION OF SAMPLING MAPS FOR ALIGNMENT MEASUREMENTS BASED ON REDUCTION OF OUT OF SPECIFICATION POINTS

CROSS-REFERENCE TO RELATED APPLICATION

The present application claims the benefit under 35 U.S.C. § 119(e) of U.S. Provisional Application Ser. No. 62/442,843, filed Jan. 5, 2017, entitled SAMPLING OPTIMIZATION METHODS FOR OVERLAY AND ALIGNMENT OUT OF SPEC POINT REDUCTION, naming Brent Allen Riggs, Onur Nihat Demirer, and William Pierson as inventors, which is incorporated herein by reference in the entirety.

TECHNICAL FIELD

The present disclosure relates generally to alignment metrology, and more particularly, to determining sampling locations for alignment metrology.

BACKGROUND

Semiconductor wafers must be accurately positioned within fabrication tools at various steps of a fabrication process to properly generate printed features. Accordingly, metrology tools may be utilized throughout a fabrication process to monitor alignment of the wafer within a fabrication tool and/or overlay of printed layers on the wafer. For example, a metrology tool may measure the alignment of a wafer in a lithography tool prior to an exposure step to ensure that a pattern to be exposed is properly aligned with existing features on the sample. By way of another example, a metrology tool may measure the overlay of two or more printed layers on the wafer to characterize the precision of the fabrication process. Alignment data may thus include, but is not limited to, sample alignment data associated with the alignment of the sample in a fabrication tool or overlay data associated with the alignment of two or more printed layers of the wafer.

Metrology tools may typically measure alignment at multiple locations across a wafer and generate a mathematical model to estimate alignment across at least a portion of the wafer. However, the number of alignment measurements performed in a production environment must be selected to balance the accuracy of model with the impact on throughput. Therefore, it would be desirable to provide a system and method for curing defects such as those identified above.

SUMMARY

A system is disclosed, in accordance with one or more illustrative embodiments of the present disclosure. In one illustrative embodiment, the system includes a metrology tool. In another illustrative embodiment, the system includes a controller. In one illustrative embodiment, the controller defines a full sampling map including a plurality of measurement locations. In another illustrative embodiment, the controller directs the metrology tool to measure alignment at each measurement location of the full sampling map for a plurality of samples to generate a reference alignment dataset in which a measured alignment is based on radiation emanating from the sample collected by the detector. In another illustrative embodiment, the controller generates two or more candidate sampling maps in which each of the two or more candidate sampling maps is a subset of the full sampling map. In accordance with one or more illustrative embodiments of the present disclosure, the controller defines two or more candidate sampling map models to estimate alignment as a function of location based on the two or more candidate sampling maps. In another illustrative embodiment, the controller calculates two or more estimated alignment datasets based on the two or more candidate sampling models in which the two or more estimated alignment datasets include estimates of alignment at the plurality of measurement locations of the full sampling map. In another illustrative embodiment, the controller determines a working sampling map from the two or more candidate sampling maps by comparing the two or more estimated alignment datasets to the reference alignment dataset in which the working sampling map includes a smallest number of alignment estimates exceeding a selected tolerance.

A system is disclosed, in accordance with one or more illustrative embodiments of the present disclosure. In one illustrative embodiment, the system includes a controller. In another illustrative embodiment, the controller defines a full sampling map including a plurality of measurement locations. In another illustrative embodiment, the controller directs the metrology tool to measure alignment at each measurement location of the full sampling map for a plurality of samples to generate a reference alignment dataset in which a measured alignment is based on radiation emanating from the sample collected by the detector in response to illumination from an illumination source. In another illustrative embodiment, the controller generates two or more candidate sampling maps in which each of the two or more candidate sampling maps being a subset of the full sampling map. In another illustrative embodiment, the controller defines two or more candidate sampling map models to estimate alignment as a function of location based on the two or more candidate sampling maps. In another illustrative embodiment, the controller calculates two or more estimated alignment datasets based on the two or more candidate sampling models in which the two or more estimated alignment datasets include estimates of alignment at the plurality of measurement locations of the full sampling map. In another illustrative embodiment, the controller determines a working sampling map from the two or more candidate sampling maps by comparing the two or more estimated alignment datasets to the reference alignment dataset in which the working sampling map includes a smallest number of alignment estimates exceeding a selected tolerance.

A system is disclosed in accordance with one or more illustrative embodiments of the present disclosure. In one illustrative embodiment, the system includes a metrology tool. In another illustrative embodiment, the system includes a controller. In another illustrative embodiment, the controller defines a full sampling map including a plurality of measurement locations. In another illustrative embodiment, the controller directs the metrology tool to measure alignment at each measurement location of the full sampling map for a plurality of samples to generate a reference alignment dataset in which a measured alignment is based on radiation emanating from the sample collected by the detector. In another illustrative embodiment, the controller defines a reference sampling map model to estimate alignment as a function of location based on the reference alignment dataset. In another illustrative embodiment, the controller calculates a reference alignment estimate dataset based on the reference alignment dataset in which the reference alignment estimate dataset includes estimates of alignment at two or more selected locations. In another illustrative embodiment, the controller generates two or more candidate sampling maps, each of the two or more candidate sampling maps being a subset of the full sampling map. In another illustrative embodiment, the controller defines two or more candidate sampling map models to estimate alignment as a function of location based on the two or more candidate sampling maps. In another illustrative embodiment, the controller calculates two or more estimated alignment datasets based on the two or more candidate sampling models in which the two or more estimated alignment datasets include estimates of alignment at the two or more selected locations. In another illustrative embodiment, the controller determines a working sampling map from the two or more candidate sampling maps by comparing the two or more estimated alignment datasets to the reference alignment estimate dataset in which the working sampling map includes a smallest number of alignment estimates exceeding a selected tolerance.

A method for selecting a sample map is disclosed in accordance with one or more illustrative embodiments of the present disclosure. In one illustrative embodiment, the method includes defining a full sampling map including a plurality of measurement locations. In another illustrative embodiment, the method includes measuring alignment at each measurement location of the full sampling map for a plurality of samples to generate a reference alignment dataset. In another illustrative embodiment, the method includes generating two or more candidate sampling maps in which each of the two or more candidate sampling maps being a subset of the full sampling map. In another illustrative embodiment, the method includes defining two or more candidate sampling map models to estimate alignment as a function of location based on the two or more candidate sampling maps. In another illustrative embodiment, the method includes calculating two or more estimated alignment datasets based on the two or more candidate sampling models in which the two or more estimated alignment datasets include estimates of alignment at the plurality of measurement locations of the full sampling map. In another illustrative embodiment, the method includes determining a working sampling map from the two or more candidate sampling maps by comparing the two or more estimated alignment datasets to the reference alignment dataset in which the working sampling map includes a smallest number of alignment estimates exceeding a selected tolerance.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF DRAWINGS

The numerous advantages of the disclosure may be better understood by those skilled in the art by reference to the accompanying figures in which.

DETAILED DESCRIPTION

Reference will now be made in detail to the subject matter disclosed, which is illustrated in the accompanying drawings. The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the disclosure.

Embodiments of the present disclosure are directed to systems and methods for determining sampling maps including measurement locations for measuring alignment on semiconductor wafers. For example, a metrology tool may measure alignment data at multiple locations across the sample. Alignment data may include, but is not limited to, sample alignment data associated with the alignment of the sample in a fabrication tool or a production tool, or overlay data associated with the alignment of two or more printed layers of the sample. Further, the alignment data may be utilized to generate alignment corrections for the sample in the current metrology tool or future tools in a production environment.

In a general sense, the number of alignment measurements performed on a wafer may increase the precision at which alignment errors across the wafer are known, but may also decrease throughput. Accordingly, it may be desirable to measure alignment at a limited number of measurement sites and generate a model of alignment as a function of position. In this regard, alignment at any location of the sample may be estimated. Additional embodiments are directed to generating a selected number of candidate sampling maps providing different numbers and/or locations of measurement sites across a wafer and comparing estimated alignment data across the wafer with a reference dataset to select a working sampling map. Further embodiments are directed to selecting the working sampling map as one of the candidate sampling maps having a smallest number of out-of-specification alignment estimates based on a selected tolerance. The selected tolerance may include an absolute value difference between an estimated alignment value and a reference alignment measurement (e.g. a residual). Further, the selected tolerance may be defined in a single direction, as having different tolerances in different directions, or based on the magnitude of the estimation error. A selection metric based on minimizing the number of out of specification alignment estimates may provide increased alignment accuracy than additional metrics (e.g. minimization of a statistical analysis of the difference between estimated alignment values and reference alignment measurements across the entire wafer) by explicitly rejecting of sampling maps providing alignment estimates outside of a selected tolerance based on estimation errors.

As used throughout the present disclosure, the term "sample" generally refers to a substrate formed of a semiconductor or non-semiconductor material (e.g. a wafer, or the like). For example, a semiconductor or non-semiconductor material may include, but is not limited to, monocrystalline silicon, gallium arsenide, and indium phosphide. For the purposes of the present disclosure, the term sample and wafer should be interpreted as interchangeable.

A semiconductor device may be formed as multiple layers of printed elements. For example, such layers may include, but are not limited to, a resist, a dielectric material, a conductive material, and a semiconductive material. Many different types of such layers are known in the art, and the term sample as used herein is intended to encompass a sample on which all types of such layers may be formed. One or more layers formed on a sample may be patterned or unpatterned. For example, a sample may include a plurality of dies, each having repeatable patterned features. Formation and processing of such layers of material may ultimately result in completed devices. Many different types of devices may be formed on a sample, and the term sample as used herein is intended to encompass a sample on which any type of device known in the art is being fabricated.

Printed features on a sample associated with a process layer may be fabricated through a series of additive or subtractive process steps such as, but not limited to, one or more material deposition steps, one or more lithography steps, one or more etching steps, or one or more lift-off steps. For example, a lithography-etch (LE) process for printing features may include, but is not limited to, depositing a layer of a photosensitive material onto a sample (e.g. a resist layer), exposing the sample with an image of a pattern mask to modify the resistivity of the photosensitive material to an etchant, and etching away either the exposed or unexposed portions of the photosensitive layer to leave behind printed features corresponding to the image of the pattern mask. Further, the photosensitive material may serve as a hard mask such that an etching step may include etching past the photosensitive material into one or more layers of the sample below the photosensitive material. The photosensitive material may optionally be removed by subsequent process steps.

Each process layer must be fabricated within specific tolerances to properly construct the final device. It is typically desirable that a given process layer be accurately aligned with respect to existing features on the sample. Accordingly, metrology tools may be utilized to monitor alignment at various stages of a fabrication process.

Additional embodiments of the present disclosure are directed to measuring alignment of a sample within a production tool (e.g. a lithography tool, or the like). In this regard, a metrology tool may generate alignment data at one or more locations on the sample. Alignment data may include, but is not limited to, first or high-order translation, rotation, or magnification of the sample within the production tool. For example, a metrology tool may generate alignment data associated with one or more alignment marks distributed across the sample. Alignment marks may indicate unidirectional alignment information (e.g. X-only or Y-only alignment information in Cartesian coordinates), or bidirectional alignment information (e.g. both X and Y information). Further, a metrology tool may, but is not required to, determine relative positions of alignment marks with respect to a nominal position or patterns on a reticle for alignment determination. Further embodiments of the present disclosure are directed to utilizing sample alignment data in a feedback and/or a feed-forward manner. For example, sample alignment data may be utilized on the fly to align or orient a sample in the production tool within a specified tolerance.

Additional embodiments of the present disclosure are directed to measuring overlay of two or more printed layers on a sample. In this regard, the accuracy of one or more production processes may be analyzed. For example, a metrology tool may generate overlay data associated with one or more overlay targets. Overlay targets may be any type of overlay targets known in the art such as, but not limited to advanced imaging metrology (AIM) targets, box in box targets, or scatterometry targets. Further embodiments of the present disclosure are directed to utilizing overlay data in a feedback and/or a feed-forward manner. For example, overlay data may be fed back to the production tool to compensate for overlay errors on future production runs. By way of another example, overlay data may be provided to additional production tools to compensate for any measured overlay inaccuracy of a sample in future fabrication steps involving that sample.

Figure 1A:
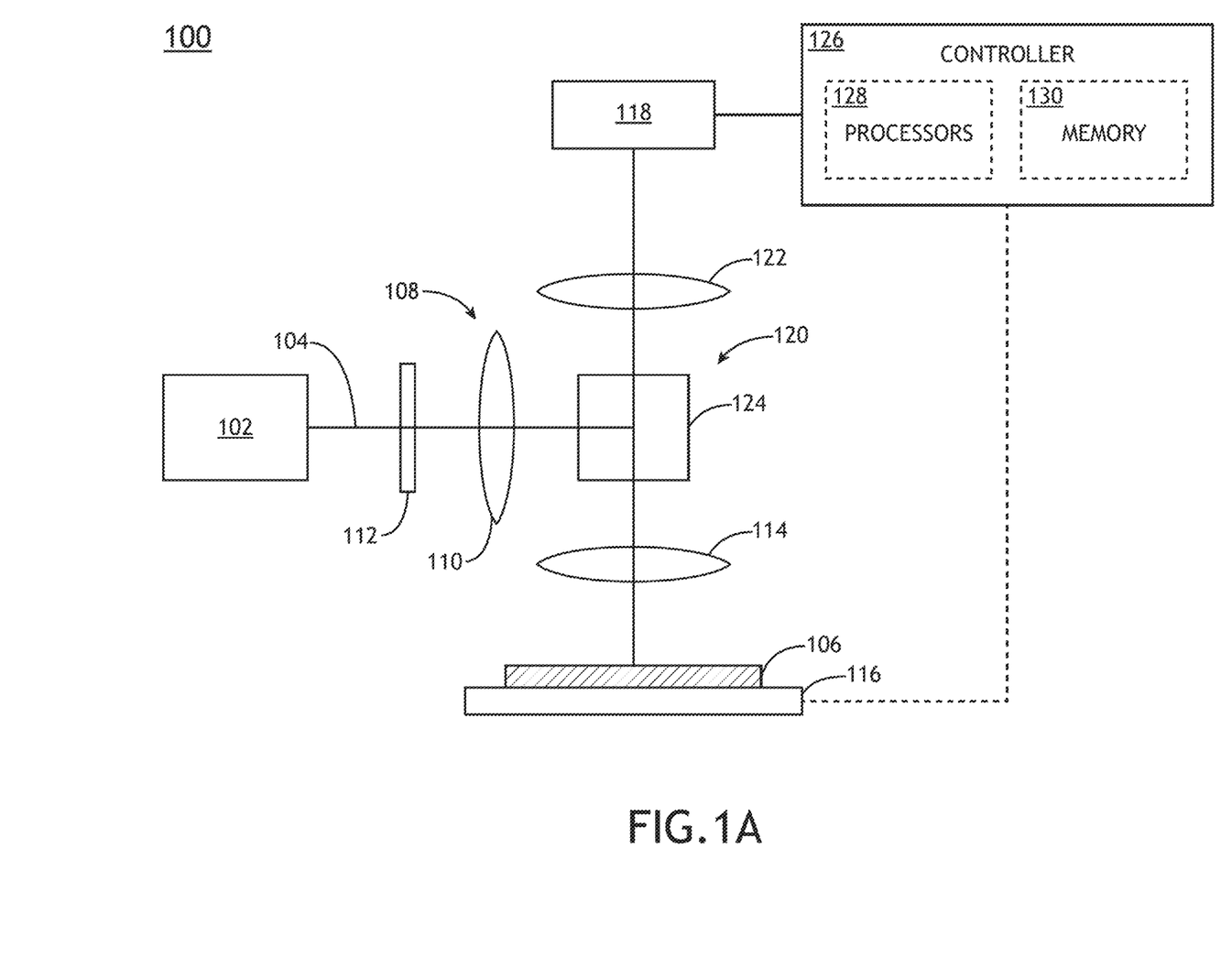
FIG. 1A is a conceptual view illustrating a metrology system, in accordance with one or more embodiments of the present disclosure.

FIG. 1A is a conceptual view illustrating a metrology system 100, in accordance with one or more embodiments of the present disclosure. The metrology system 100 may measure alignment using any method known in the art. In one embodiment, the metrology system 100 includes an image-based metrology tool to measure alignment data based on the generation of one or more images of a sample. In another embodiment, the metrology system 100 includes a scatterometry-based metrology tool to measure metrology data based on the scattering (reflection, diffraction, diffuse scattering, or the like) of light from the sample.

In one embodiment, the metrology system 100 includes a metrology illumination source 102 to generate a metrology illumination beam 104. The metrology illumination beam 104 may include one or more selected wavelengths of light including, but not limited to, ultraviolet (UV) radiation, visible radiation, or infrared (IR) radiation.

In another embodiment, the metrology illumination source 102 directs the metrology illumination beam 104 to a sample 106 via an illumination pathway 108. The illumination pathway 108 may include one or more lenses 110 or additional optical components 112 suitable for modifying and/or conditioning the metrology illumination beam 104. For example, the one or more optical components 112 may include, but are not limited to, one or more polarizers, one or more filters, one or more beam splitters, one or more diffusers, one or more homogenizers, one or more apodizers, or one or more beam shapers. In another embodiment, the metrology system 100 includes an objective lens 114 to focus the metrology illumination beam 104 onto the sample 106.

In another embodiment, the sample 106 is disposed on a sample stage 116. The sample stage 116 may include any device suitable for positioning the sample 106 within the metrology system 100. For example, the sample stage 116 may include any combination of linear translation stages, rotational stages, tip/tilt stages or the like.

In another embodiment, the metrology system 100 includes a detector 118 configured to capture radiation emanating from the sample 106 through a collection pathway 120. For example, may receive an image of the sample 106 provided by elements in the collection pathway 120 (e.g. the objective lens 114, more lenses 122, or the like). By way of another example, a detector 118 may receive radiation reflected or scattered (e.g. via specular reflection, diffuse reflection, and the like) from the sample 106. By way of another example, a detector 118 may receive radiation generated by the sample 106 (e.g. luminescence associated with absorption of the metrology illumination beam 104, or the like). By way of another example, a detector 118 may receive one or more diffracted orders of radiation from the sample 106 (e.g. 0-order diffraction, ±1 order diffraction, ±2 order diffraction, and the like).

The detector 118 may include any type of optical detector known in the art suitable for measuring illumination received from the sample 106. For example, a detector 118 may include, but is not limited to, a CCD detector, a TDI detector, a photomultiplier tube (PMT), an avalanche photodiode (APD), or the like. In another embodiment, a detector 118 may include a spectroscopic detector suitable for identifying wavelengths of radiation emanating from the sample 106.

The collection pathway 120 may further include any number of optical elements to direct and/or modify illumination collected by the objective lens 114 including, but not limited to one or more lenses 122, one or more filters, one or more polarizers, or one or more beam blocks.

In one embodiment, as illustrated in FIG. 1A, the metrology system 100 includes a beamsplitter 124 oriented such that the objective lens 114 may simultaneously direct the metrology illumination beam 104 to the sample 106 and collect radiation emanating from the sample 106. In this regard, the metrology system 100 may be configured in an epi-illumination mode.

In another embodiment, the metrology system 100 includes a controller 126. In another embodiment, the controller 126 includes one or more processors 128 configured to execute program instructions maintained on a memory medium 130. In this regard, the one or more processors 128 of controller 126 may execute any of the various process steps described throughout the present disclosure. Further, the controller 126 may be configured to receive data including, but not limited to, metrology data (e.g. alignment measurement results, images of the target, pupil images, and the like) or metrology metrics (e.g. precision, tool-induced shift, sensitivity, diffraction efficiency, and the like).

The one or more processors 128 of a controller 126 may include any processing element known in the art. In this sense, the one or more processors 128 may include any microprocessor-type device configured to execute algorithms and/or instructions. In one embodiment, the one or more processors 128 may consist of a desktop computer, mainframe computer system, workstation, image computer, parallel processor, or any other computer system (e.g., networked computer) configured to execute a program configured to operate the metrology system 100, as described throughout the present disclosure. It is further recognized that the term "processor" may be broadly defined to encompass any device having one or more processing elements, which execute program instructions from a non-transitory memory medium 130. Further, the steps described throughout the present disclosure may be carried out by a single controller 126 or, alternatively, multiple controllers. Additionally, the controller 126 may include one or more controllers housed in a common housing or within multiple housings. In this way, any controller or combination of controllers may be separately packaged as a module suitable for integration into metrology system 100. Further, the controller 126 may analyze data received from the detector 118 and feed the data to additional components within the metrology system 100 or external to the metrology system 100.

The memory medium 130 may include any storage medium known in the art suitable for storing program instructions executable by the associated one or more processors 128. For example, the memory medium 130 may include a non-transitory memory medium. By way of another example, the memory medium 130 may include, but is not limited to, a read-only memory, a random access memory, a magnetic or optical memory device (e.g., disk), a magnetic tape, a solid state drive and the like. It is further noted that memory medium 130 may be housed in a common controller housing with the one or more processors 128. In one embodiment, the memory medium 130 may be located remotely with respect to the physical location of the one or more processors 128 and controller 126. For instance, the one or more processors 128 of controller 126 may access a remote memory (e.g., server), accessible through a network (e.g., internet, intranet and the like). Therefore, the above description should not be interpreted as a limitation on the present invention but merely as an illustration.

Figure 1B:
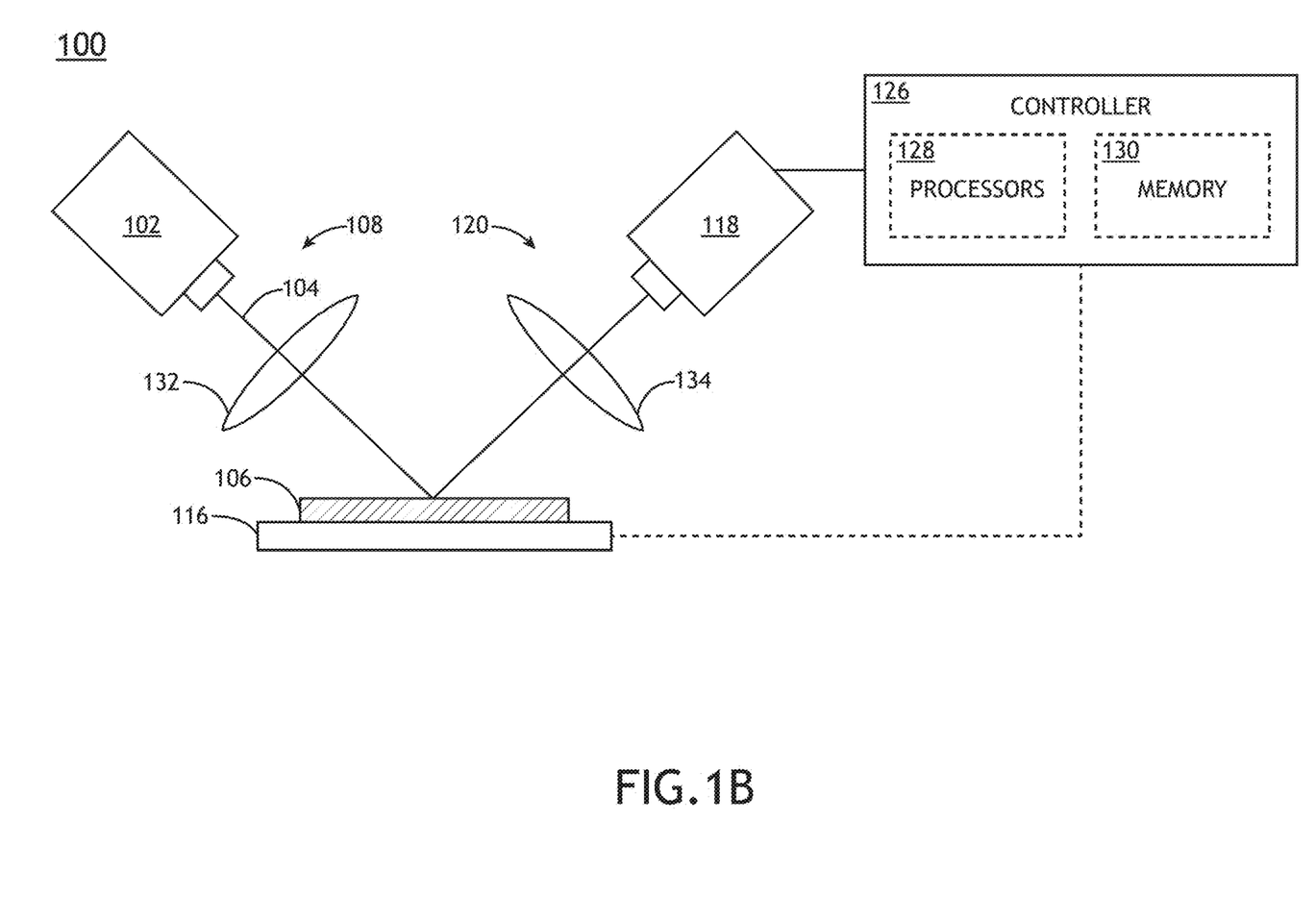
FIG. 1B is a conceptual view illustrating a metrology system in which an illumination pathway and a collection pathway include separate elements, in accordance with one or more embodiments of the present disclosure.

FIG. 1B is a conceptual view illustrating a metrology system 100 in which an illumination pathway 108 and a collection pathway 120 include separate elements, in accordance with one or more embodiments of the present disclosure. For example, the illumination pathway 108 may utilize a first focusing element 132 to focus the metrology illumination beam 104 onto the sample 106 and the collection pathway 120 may utilize a second focusing element 134 to collect radiation from the sample 106. In this regard, the numerical apertures of the first focusing element 132 and the second focusing element 134 may be different. Further, it is noted herein that the metrology system 100 depicted in FIG. 1B may facilitate multi-angle illumination of the sample 106, and/or more than one metrology illumination source 102 (e.g. coupled to one or more additional detectors 118). In this regard, the metrology system 100 depicted in FIG. 1B may perform multiple metrology measurements. In another embodiment, one or more optical components may be mounted to a rotatable arm (not shown) pivoting around the sample 106 such that the angle of incidence of the metrology illumination beam 104 on the sample 106 may be controlled by the position of the rotatable arm.

In another embodiment, the metrology system 100 may include multiple detectors 118 (e.g. associated with multiple beam paths generated by one or more beamsplitters) to facilitate multiple metrology measurements (e.g. multiple metrology tools) by the metrology system 100.

In another embodiment, the angle of incidence of the metrology illumination beam 104 on the sample 106 is adjustable. For example, the path of the metrology illumination beam 104 through the beamsplitter 124 and the objective lens 114 may be adjusted to control the angle of incidence of the metrology illumination beam 104 on the sample 106. In this regard, the metrology illumination beam 104 may have a nominal path through the beamsplitter 124 and the objective lens 114 such that the metrology illumination beam 104 has a normal incidence angle on the sample 106. Further, the angle of incidence of the metrology illumination beam 104 on the sample 106 may be controlled by modifying the position and/or angle of the metrology illumination beam 104 on the beamsplitter 124 (e.g. by rotatable mirrors, a spatial light modulator, a free-form illumination source, or the like). In another embodiment, the metrology illumination source 102 directs the one or more metrology illumination beam 104 to the sample 106 at an angle (e.g. a glancing angle, a 45-degree angle, or the like).

In another embodiment, the controller 126 is communicatively coupled to the metrology illumination source 102 and/or elements of the illumination pathway 108 to direct the adjustment of the angle of incidence between the metrology illumination beam 104 and the sample 106. In another embodiment, the controller 126 directs the metrology illumination source 102 to provide one or more selected wavelengths of illumination (e.g. in response to feedback). In a general sense, the controller 126 may be communicatively coupled with any element within the metrology system 100.

Figure 2:
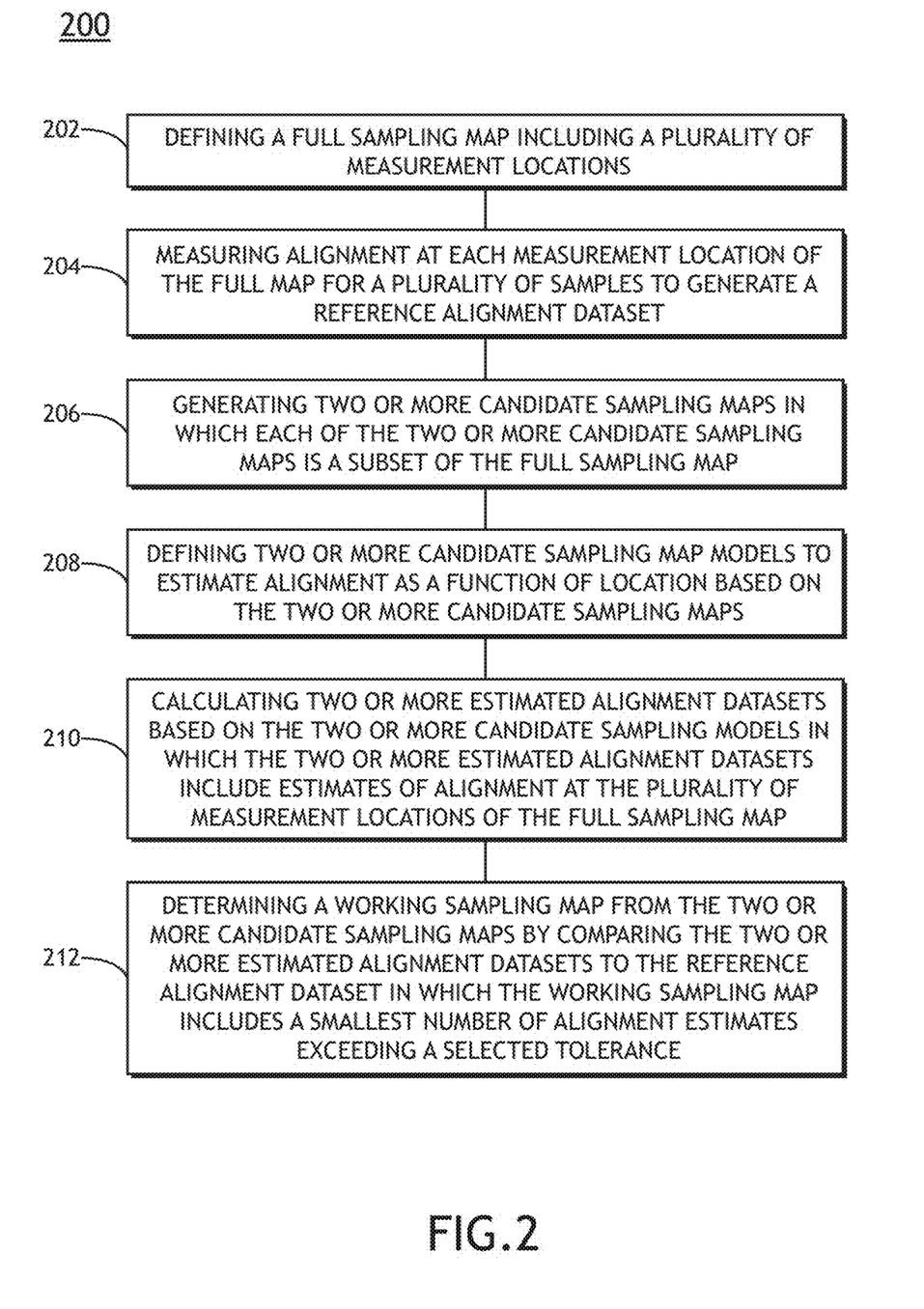
FIG. 2 is a flow diagram illustrating steps performed in a method for determining a sampling map for alignment measurements, in accordance with one or more embodiments of the present disclosure.

FIG. 2 is a flow diagram illustrating steps performed in a method 200 for determining a sampling map for alignment measurements, in accordance with one or more embodiments of the present disclosure. Applicant notes that the embodiments and enabling technologies described previously herein in the context of metrology system 100 should be interpreted to extend to method 200. It is further noted, however, that the method 200 is not limited to the architecture of metrology system 100.

A sample may be divided into multiple fields. For example, a sample may be divided into fields based on groupings of fabricated features on the sample (e.g. chips). By way of another example, a sample may be divided into fields corresponding to a field of view of one or more production tools (e.g. lithography tools, metrology tools, or the like). For instance, a lithography stepper tool may sequentially expose a series of fields on a sample in which the size of each field corresponds to a field of view of the lithography stepper tool. Accordingly, alignment (e.g. sample alignment, overlay alignment, or the like) may be measured and potentially corrected for each field of the sample. Further, each field of the sample may have multiple locations at which alignment may be measured.

It may not be practical or desirable to measure alignment at multiple locations within each field of the sample. Accordingly, it may be desirable to measure the field at a single location within each field, or in some cases, to measure the field at a subset of the fields on the sample. In such cases, alignment may be measured at a subset of possible measurement locations defined by a working sampling map and a model may be generated to estimate alignment as a function of location on the sample based on alignment measured at these locations.

In one embodiment, the method 200 includes a step 202 of defining a full sampling map including a plurality of measurement locations.

Figure 3:
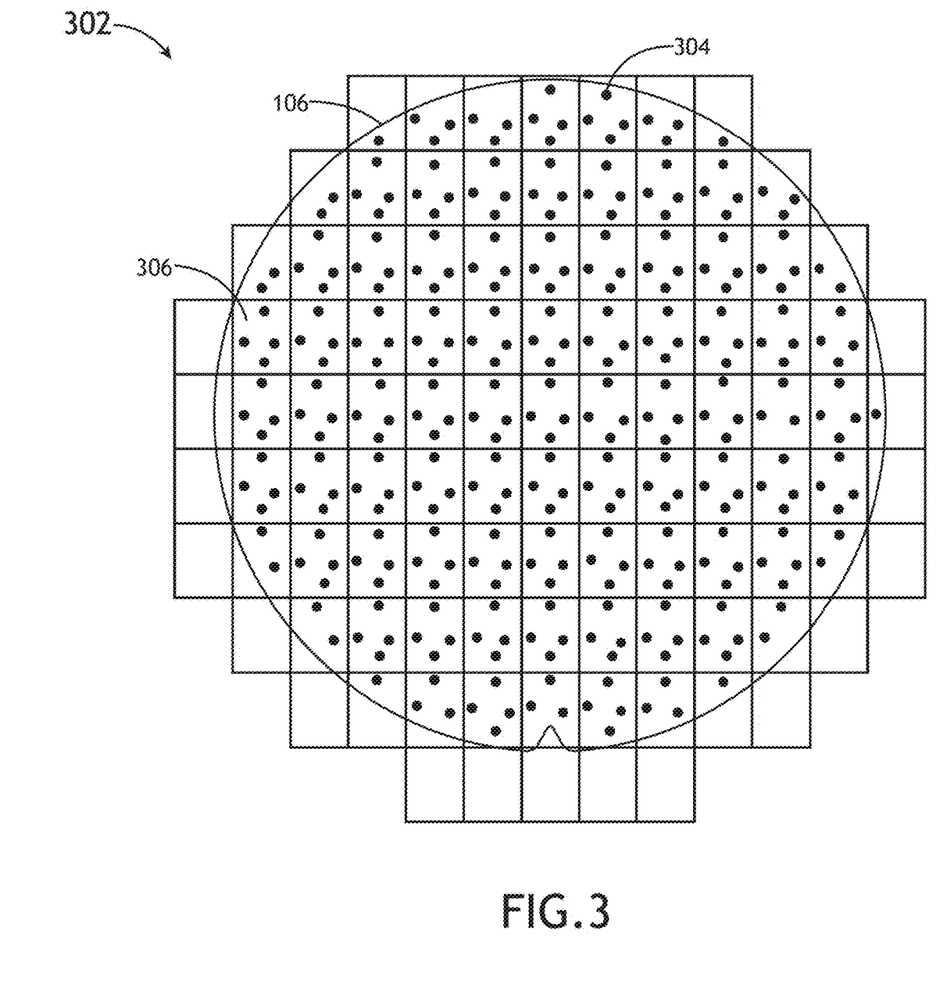
FIG. 3 is a conceptual view of a full sampling map, in accordance with one or more embodiments of the present disclosure.

FIG. 3 is a conceptual view of a full sampling map 302, in accordance with one or more embodiments of the present disclosure. In one embodiment, a full sampling map 302 includes a plurality of measurement locations 304 at which alignment may be measured on a sample. For example, each measurement location 304 of the full sampling map 302 may include one or more alignment marks or one or more overlay targets such that a metrology tool (e.g. associated with a metrology system 100) may measure alignment at each measurement location 304.

A full sampling map 302 may include a sufficient number of measurement locations 304 to characterize alignment on a sample according to a selected precision. For example, a full sampling map 302 may include, but is not required to include, at least one measurement location within each field 306 of a sample (e.g. sample 106). In a general sense, the precision at which alignment may be measured and thus corrected increases with the number of measurement locations 304.

In one embodiment, the full sampling map 302 includes multiple measurement locations 304 for each field 306. For example, as illustrated in FIG. 3, each field 306 may include, but is not limited to, four measurement locations 304 within the full sampling map 302. In this regard, an alignment measurement associated with a particular field 306 may be generated through an analysis of the multiple alignment measurements taken within the field 306. In one instance, an alignment measurement may be generated by averaging the multiple alignment measurements taken within the field 306. In another instance, an alignment measurement may be generated by taking a median value of the multiple alignment measurements taken within the field 306.

The measurement locations 304 within each field 306 may be distributed according to any distribution. In one embodiment, as illustrated in FIG. 3, the measurement locations may be constant for each field 306. In another embodiment (not shown), the measurement locations may vary for different fields 306.

In another embodiment, the full sampling map 302 includes a single measurement location 304 for each field 306. In another embodiment, the full sampling map 302 may include measurement locations 304 for a subset of fields 306.

In another embodiment, the method 200 includes a step 204 of measuring alignment at each measurement location of the full sampling map 302 for a plurality of samples to generate a reference alignment dataset.

It is recognized herein that alignment errors may be generated by multiple sources of error including, but not limited to, wafer-level errors, field-level errors, or noise. Wafer-level errors may include, but are not limited to stage-control errors (e.g. jitter, repeatability errors, or the like associated with the sample stage 116) or wafer distortion. Field-level errors may include, but are not limited to variations in illumination conditions from field to field associated with the illumination source, or reticle alignment errors. Additionally, errors may be related to thermal gradients (e.g. associated with lens heating in scanners or on the wafer stage of immersion scanners) or due to processing steps in which physical degradation of alignment or overlay marks induces errors (e.g. during a chemical mechanical planarization (CMP) process, or the like.). Further, errors may be introduced by contaminates during any phase of a production process. In a general sense, some errors may be systematic and may appear relatively constantly over a series of samples, while others may randomly fluctuate.

Accordingly, a reference alignment dataset may be generated based on alignment measurements from any number of samples to provide a robust representation of alignment errors for the selection of a working sampling map. For example, the reference alignment dataset may be generated based on alignment measurements from on a single sample (e.g. a reference sample, a calibration sample, or the like). By way of another example, the reference alignment dataset may be generated based on alignment measurements from multiple samples. Further, the reference alignment dataset may be generated based on alignment measurements from one or more samples from multiple lots.

In one embodiment, the reference alignment dataset includes all alignment measurements associated with each measurement location 304 for all measured samples. In another embodiment, the reference alignment dataset includes one or more statistical representations of the alignment measurements associated with each measurement location 304 for the measured samples. For example, an alignment data point in the reference alignment dataset may include a representation of the value of measured alignment errors (e.g. a mean value, a median value, or the like) of the measured samples. By way of another example, an alignment data point in the reference alignment dataset may include a representation of the variability of measured alignment errors (e.g. a standard deviation, a variance, or the like) of the measured samples. By way of a further example, an alignment data point in the reference alignment dataset may include a metric representing a combination of value and variability of the measured alignment errors such as, but not limited to the mean alignment error plus three times the standard deviation of the measured alignment errors (e.g. the M3σ value).

In another embodiment, the method 200 includes a step 206 of generating two or more candidate sampling maps in which each of the two or more candidate sampling maps is a subset of the full sampling map.

Figure 4A:
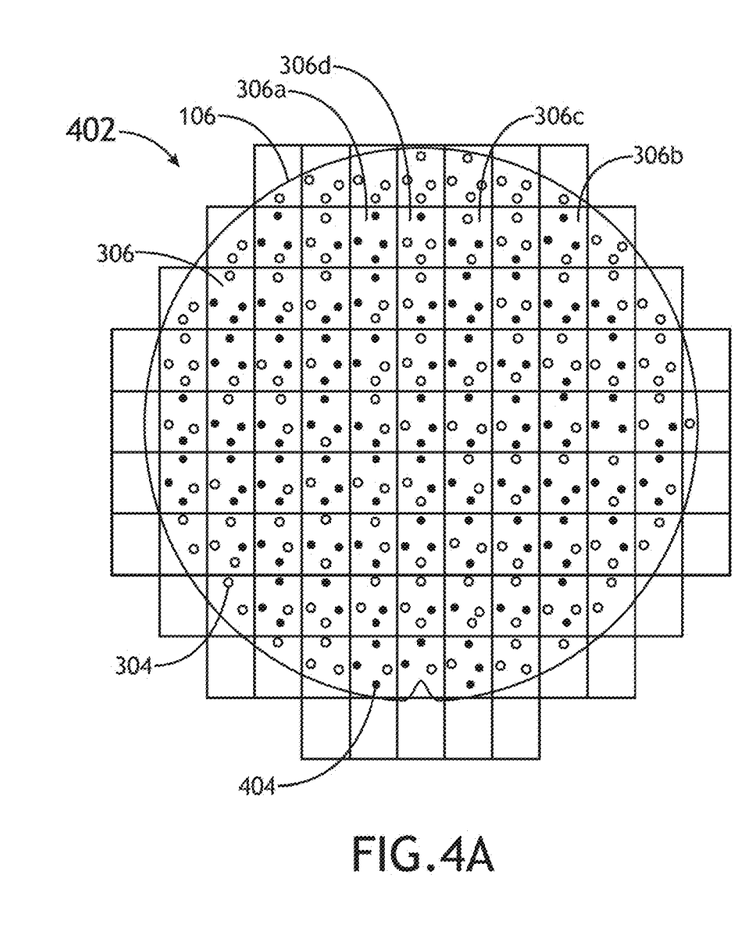
FIG. 4A is a conceptual view of a candidate sampling map, in accordance with one or more embodiments of the present disclosure.
Figure 4B:
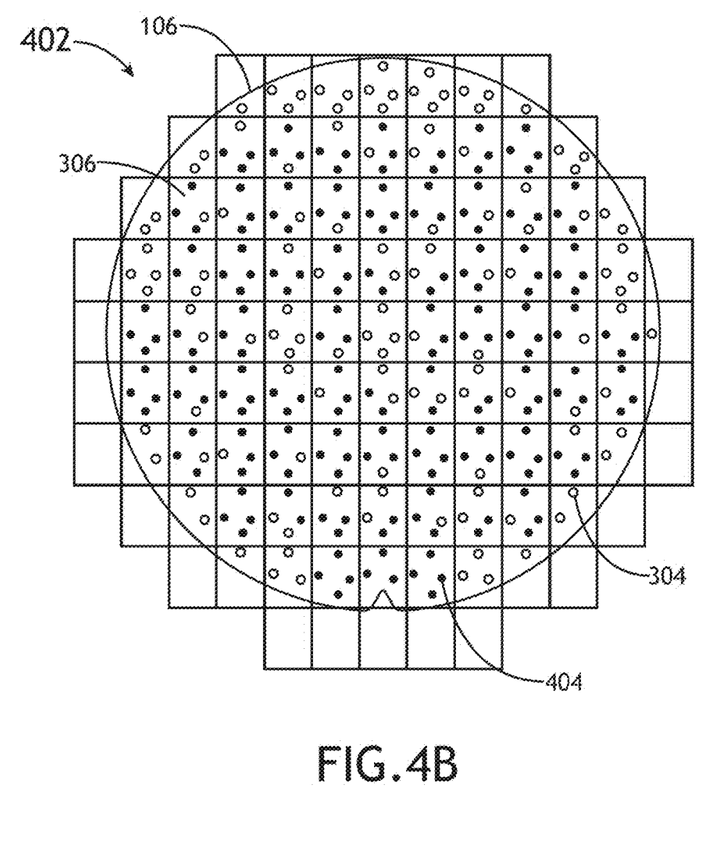
FIG. 4B is a conceptual view of a candidate sampling map, in accordance with one or more embodiments of the present disclosure.

FIGS. 4A and 4B are conceptual views of candidate sampling maps 402, in accordance with one or more embodiments of the present disclosure. In one embodiment, a candidate sampling map 402 includes candidate measurement locations 404 that are a subset of the measurement locations 304 of the full sampling map 302. For example, as illustrated in FIGS. 4A and 4B, the measurement locations 304 of the full sampling map 302 are illustrated as open circles and the candidate measurement locations 404 are illustrated as filled circles. In this regard, only the candidate measurement locations 404 illustrated as filled circles are selected for alignment measurement for a given candidate sampling map 402.

The step 206 may include generating any number of candidate sampling maps 402. In a general sense, increasing the number of candidate sampling maps 402 generated in step 206 may improve the precision of a working sample map to be selected from the candidate sampling maps 402.

Further, candidate measurement locations 404 of a candidate sampling map 402 may be arranged according to any distribution. In one embodiment, the candidate measurement locations 404 of a candidate sampling map 402 are distributed in a random distribution.

In another embodiment, the candidate measurement locations 404 of a candidate sampling map 402 are distributed in a periodic distribution. For example, multiple candidate sampling maps 402 may include candidate measurement locations 404 distributed with different periodicities (e.g. different periodicities along one or more directions). By way of another example, multiple candidate sampling maps 402 may include candidate measurement locations 404 distributed with a common periodicity and varying offsets in one or more directions.

In another embodiment, the candidate measurement locations 404 of a candidate sampling map 402 are distributed based on one or more fabricated features on the sample. It is recognized herein that the size and/or density of features to be fabricated on a sample may impact the relative locations at which features are ultimately printed (e.g. pattern placement error). Accordingly, candidate measurement locations 404 of a candidate sampling map 402 may be distributed based on known differences between fabricated features on different portions of the sample.

In another embodiment, the candidate measurement locations 404 of a candidate sampling map 402 are distributed based on historical alignment data. Accordingly, candidate measurement locations 404 of a candidate sampling map 402 may be arranged to compensate for known sources of error. For example, a particular process tool may exhibit increased errors near the edges of a sample relative to a central region of the sample. In this case, the step 206 may include generating candidate sampling maps 402 having relatively more candidate measurement locations 404 distributed along edges than a central region.

Further, a candidate sampling map 402 may include any number of candidate measurement locations 404 in a given field 306. In one embodiment, as illustrated in FIGS. 4A and 4B, the number of candidate measurement locations 404 in a given field 306 varies. For example, referring to FIG. 4A, field 306a includes four candidate measurement locations 404, field 306b includes three candidate measurement locations 404, field 306c includes two candidate measurement locations 404, and field 306d includes one candidate measurement location 404.

In another embodiment (not shown), at least one candidate sampling map 402 includes a common number of candidate measurement locations 404 within each field 306.

In a further embodiment, sampling maps may be determined based on one or more rules defining a desired distribution of candidate measurement locations 404 (e.g. weighting or spatial rules, field balancing rules, target balancing rules, or the like). For example, sampling maps may be determined based on rules in which the number and/or density of candidate measurement locations 404 in different portions of the sample (e.g. edge portions, central portions, selected quadrants, or the like) varies according to rules applied to each portion of the sample.

In another embodiment, step 206 includes generating at least one candidate sampling map 402 having candidate measurement locations 404 within a selected number of fields 306. For example, for samples having N fields 306, a first candidate sampling map 402 may include N fields 306 having candidate measurement locations 404, a second candidate sampling map 402 may include N−1 fields 306 having candidate measurement locations 404, a third candidate sampling map 402 may include N−2 fields 306 having candidate measurement locations 404, and so on. Accordingly, the number of fields 306 having candidate measurement locations 404 may be optimized within a specified tolerance. In a general sense, a candidate sampling map 402 may have candidate measurement locations 404 in any number of fields 306.

In another embodiment, the method 200 includes a step 208 of defining two or more candidate sampling map models to estimate alignment as a function of location based on the two or more candidate sampling maps 402. A candidate sampling map model may include one or more mathematical expressions suitable for calculating alignment as a function of location based on a finite set of data. For example, a candidate sampling map model may include, but is not required to include, an expression associated with each coordinate direction of a coordinate system (e.g. a Cartesian coordinate system including X and Y coordinates, a polar coordinate system including magnitude and polar angle coordinates, or the like).

In one embodiment, step 208 includes filtering the reference alignment data based on each candidate sampling map 402 generated in step 206 to produce a candidate dataset for each candidate sampling map 402. In this regard, filtering reference alignment data simulates sampling the reference alignment dataset with each candidate sampling map 402. Further, step 208 may include defining a candidate sampling map model for each candidate sampling map 402 based on the candidate datasets.

Candidate sampling map models may be formed through any technique known in the art suitable for estimating alignment as a function of location based on a dataset. In one embodiment, a candidate sampling map model may be generated by an interpolation technique such as, but not limited to, linear interpolation, polynomial interpolation, or spline interpolation. In this regard, a candidate sampling map model may perfectly estimate alignment at the candidate measurement locations 404 and may estimate alignment at locations between the candidate measurement locations 404. In another embodiment, a candidate sampling map model may be generated by a curve-fitting and/or a regression technique (e.g. polynomial regression, least squares regression, a smoothing operation, or the like) such that the candidate sampling map model may not perfectly estimate at the candidate measurement locations 404, but may mitigate outliers in the reference alignment dataset.

In another embodiment, the method 200 includes a step 210 of calculating two or more estimated alignment datasets based on the two or more candidate sampling models in which the two or more estimated alignment datasets include estimates of alignment at the plurality of measurement locations of the full sampling map.

Figure 5:
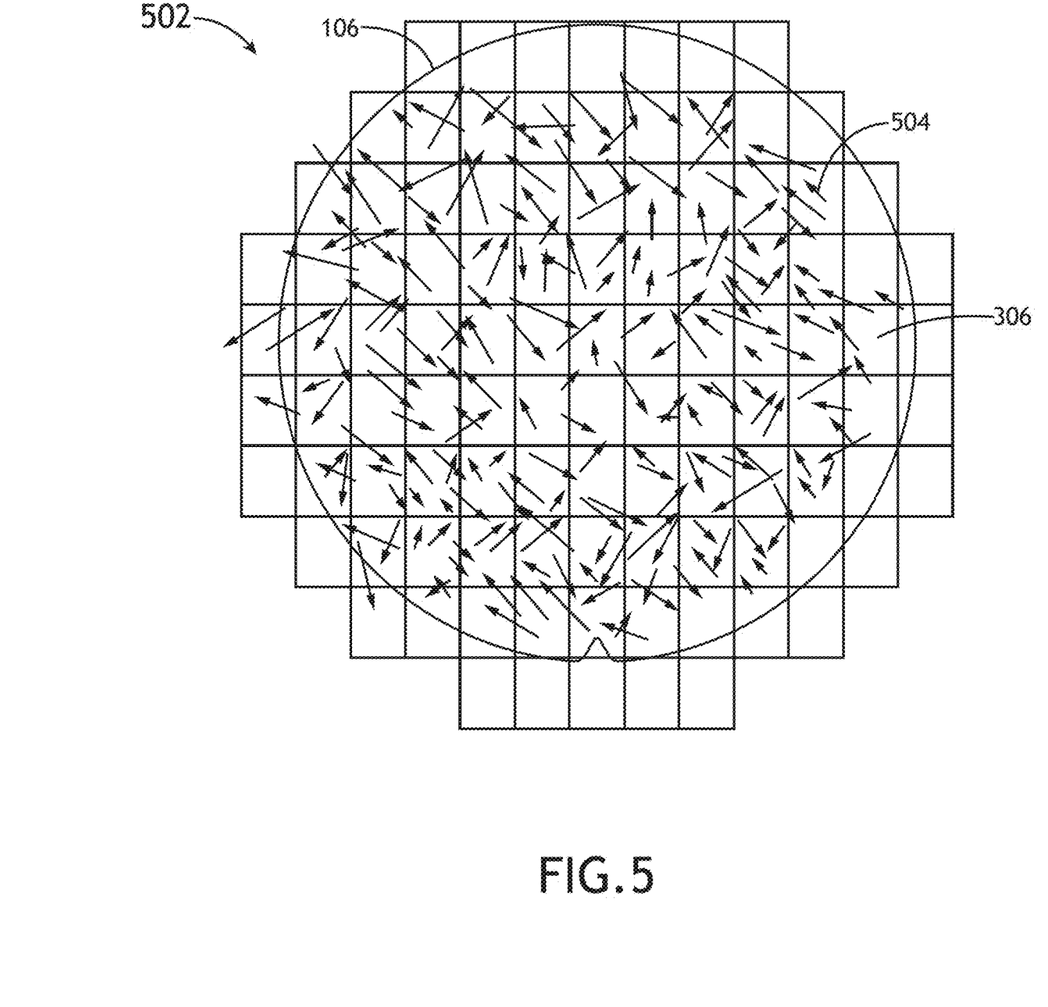
FIG. 5 includes a conceptual view of an estimated alignment dataset, in accordance with one or more embodiments of the present disclosure.

FIG. 5 includes a conceptual view of an estimated alignment dataset 502, in accordance with one or more embodiments of the present disclosure. In one embodiment, each data point of the estimated alignment dataset includes a vector 504 providing magnitude and direction of estimated alignment (e.g. estimated alignment error) based on a candidate dataset and a candidate sampling map model of a candidate sampling map 402.

Accordingly, step 210 may include estimating the reference alignment dataset based on portions of the reference alignment dataset sampled by the candidate sampling maps 402 and modeling the missing portions of the reference alignment dataset.

In another embodiment, the method 200 includes a step 212 of determining a working sampling map from the two or more candidate sampling maps by comparing the two or more estimated alignment datasets to the reference alignment dataset. For example, the working sampling map may be selected based on a selected tolerance in which the working sampling map includes a smallest number of alignment estimates exceeding a selected tolerance. In this regard, the different candidate sampling maps 402 may be compared based on the accuracy at which the missing portions of the reference alignment dataset may be recreated. Further, the accuracy at which the missing portions of the reference alignment dataset may be recreated may be evaluated based on a number of estimated alignment data points that are outside of a specified tolerance.

A tolerance may be defined with respect to estimated alignment data (e.g. from step 210) or with respect to a difference between an estimated alignment (e.g. from an estimated alignment dataset associated with a candidate sampling map 402) and a reference alignment measurement from the reference alignment dataset (e.g. a residual). Further, a tolerance may include maximum or minimum limitations. For example, a tolerance may define maximum or minimum limitations of estimated alignment data. By way of another example, a tolerance may define a maximum or minimum value of residual data. Accordingly, step 212 may include determining, for each candidate sampling map 402, a number of out of specification locations at which the estimated alignment of step 210 exceeds (e.g. violates) a selected maximum or minimum limitation.

In one embodiment, the selected tolerance includes a threshold associated with a difference between an estimated alignment (e.g. from an estimated alignment dataset associated with a candidate sampling map 402) and a reference alignment measurement from the reference alignment dataset (e.g. a residual). For example, as described previously herein, an alignment data point in the reference alignment dataset may include a representation of the value of measured alignment errors (e.g. a mean value, a median value, or the like). Accordingly, the selected tolerance may include, but is not required to include, the absolute value of a residual. In this regard, a tolerance including an absolute value of a residual may equally consider errors in all directions, whereas a tolerance including a pure residual may distinguish errors based on direction.

The tolerance may be defined along one or more coordinate directions of a coordinate system. In one embodiment, a tolerance includes a maximum value of a residual along a single coordinate of a coordinate system (e.g. an X coordinate or a Y coordinate in a Cartesian coordinate system, a magnitude coordinate or a polar angle coordinate in a polar coordinate system, or the like). For example, a tolerance may be defined such that a residual may not exceed a selected magnitude (e.g. a select number of nanometers, or the like). By way of another example, a tolerance may be defined such that a residual measured along an X direction may not exceed a selected value.

In another embodiment, a tolerance includes a first tolerance value including a maximum value of a residual along a first coordinate of a coordinate system and a second tolerance value including a maximum value of a residual along a second coordinate of the coordinate system. For example, a tolerance may include maximum residual values of 4 nm along an X direction and 6 nm along a Y direction. In this regard, alignment errors along different coordinates may be weighted differently.

In another embodiment, a tolerance may be defined as a percentage of a residual with respect to the alignment data from the reference alignment dataset. For example, a tolerance may include a maximum percentage by which a residual may vary from alignment data from the reference alignment dataset.

In another embodiment, step 212 further includes determining a working sampling map based on a statistical analysis of residual data across an entire sample for each candidate sampling map 402. For example, a mean plus three standard deviations (M3σ) metric may be calculated based on the residuals to facilitate the determination of a working sample map. For example, it may be the case that multiple candidate sampling maps 402 provide the same or similar numbers of out of specification alignment estimates. Accordingly, a statistical analysis of residual data may facilitate the determination of the working sampling map.

In another embodiment, a working sampling map is determined from the two or more candidate sampling maps at two or more selected locations not included as measurement locations 304 in the full sampling map 302. For example, it may be desirable to evaluate the ability of candidate sampling maps 402 to accurately estimate alignment at one point per field (e.g. the center of each field), regardless of whether the candidate sampling maps 402 included a candidate measurement location 404 within each field. In this regard, the single alignment estimate per field may provide a correctable as feedback to one or more production tools (e.g. a stepper, or the like). In this case, the method 200 may include generating a reference sampling map model to estimate alignment as a function of position and evaluate the reference sampling map model as well as each of the candidate sampling map models at the two or more selected locations. Further, the method 200 may include determining a working sampling map as the candidate sampling map 402 that provides the smallest number of alignment estimates exceeding a selected tolerance.

Referring again to FIGS. 1A and 1B, embodiments of the present disclosure may incorporate any type of metrology system known in the art including, but not limited to, a spectroscopic ellipsometer with one or more angles of illumination, a spectroscopic ellipsometer for measuring Mueller matrix elements (e.g. using rotating compensators), a single-wavelength ellipsometer, an angle-resolved ellipsometer (e.g. a beam-profile ellipsometer), a spectroscopic reflectometer, a single-wavelength reflectometer, an angle-resolved reflectometer (e.g. a beam-profile reflectometer), an imaging system, a pupil imaging system, a spectral imaging system, or a scatterometer. Further, the metrology system may include a single metrology tool or multiple metrology tools. A metrology system incorporating multiple metrology tools is generally described in U.S. Pat. No. 7,478,019. The use of high-numerical-aperture tools with simultaneous multiple angle-of-incidence illumination is generally described by U.S. Pat. No. 6,429,943, which is incorporated herein by reference in its entirety. Quantifying imaging performance in high NA optical lithography is generally described in Lee, et al., "Quantifying imaging performance bounds of extreme dipole illumination in high NA optical lithography", Proc. of SPIE Vol. 9985 99850X-1 (2016), which is incorporated herein by reference in its entirety.

It is further recognized herein that a metrology tool may measure characteristics of one or more targets on the sample such as, but not limited to alignment position or overlay. The targets may include certain regions of interest that are periodic in nature, such as for example gratings in a memory die. The metrology targets may further possess various spatial characteristics and are typically constructed of one or more cells which may include features in one or more layers which may have been printed in one or more lithographically distinct exposures. The targets or the cells may possess various symmetries such as two-fold or four-fold rotation symmetry, reflection symmetry. Examples of such metrology structures are described in U.S. Pat. No. 6,985,618, which is included herein by reference in its entirety. Different cells or combinations of cells may belong to distinct layers or exposure steps. The individual cells may comprise either isolated non-periodic features or alternately they may be constructed from one, two or three dimensional periodic structures or combinations of non-periodic and periodic structures. The periodic structures may be non-segmented or they may be constructed from finely segmented features which may at or close to the minimum design rule of the lithographic process used to print them. The use of a metrology tool to characterize non-periodic targets is generally described in U.S. Pat. No. 9,291,554, granted on Mar. 22, 2016, which is incorporated herein by reference in its entirety.

Metrology targets may be collocated or in close proximity with dummification structures in the same layer or in a layer above, below or in between the layers of the metrology structures. Targets can include multiple layers (e.g. films) whose thicknesses can be measured by the metrology tool.

Targets can include target designs placed on the semiconductor wafer for use (e.g., with alignment, overlay registration operations, and the like). Further, targets may be located at multiple sites on the semiconductor wafer. For example, targets may be located within scribe lines (e.g., between dies) and/or located in the die itself. Multiple targets may be measured simultaneously or serially by the same or multiple metrology tools as described in U.S. Pat. No. 7,478,019, which is incorporated herein by reference in its entirety.

Additionally, measurement of parameters of interest may involve a number of algorithms. For example, optical interaction of the metrology illumination beam 104 with a metrology target on the sample 106 may, but is not limited to, be modeled using an electro-magnetic (EM) solver. Further, the EM solver may utilize any method known in the art including, but not limited to, rigorous coupled-wave analysis (RCWA), finite element method analysis, method of moments analysis, a surface integral technique, a volume integral technique, or a finite-difference time-domain analysis. Additionally, collected data may be analyzed using data fitting and optimization techniques including, but not limited to libraries, fast-reduced-order models, regression, machine-learning algorithms such as neural networks, support-vector machines (SVM), dimensionality-reduction algorithms (e.g. principal component analysis (PCA), independent component analysis (ICA), local-linear embedding (LLE), and the like), sparse representation of data (e.g. Fourier or wavelet transforms, Kalman filters, algorithms to promote matching from same or different tool types, and the like). For example, data collection and/or fitting may be, but is not required to be, performed by the Signal Response Metrology (SRM) software product provided by KLA-TENCOR.

In another embodiment, raw data generated by a metrology tool is analyzed by algorithms that do not include modeling, optimization and/or fitting (e.g. phase characterization, or the like). The use of symmetric target design in scatterometry overlay metrology is generally described in U.S. Patent Publication No. 2015/0204664, published on Jul. 23, 2015, which is incorporated herein by reference in its entirety. It is noted herein that computational algorithms performed by the controller may be, but are not required to be, tailored for metrology applications through the use of parallelization, distributed computation, load-balancing, multi-service support, design and implementation of computational hardware, or dynamic load optimization. Further, various implementations of algorithms may be, but are not required to be, performed by the controller (e.g. through firmware, software, or field-programmable gate arrays (FPGAs), and the like), or one or more programmable optical elements associated with the metrology tool. The use of process modeling is generally described in U.S. Patent Publication No. 2014/0172394, published on Jun. 19, 2014, which is incorporated herein by reference in its entirety.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected", or "coupled", to each other to achieve the desired functionality, and any two components capable of being so associated can also be viewed as being "couplable", to each other to achieve the desired functionality. Specific examples of couplable include but are not limited to physically interactable and/or physically interacting components and/or wirelessly interactable and/or wirelessly interacting components and/or logically interactable and/or logically interacting components.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. A system comprising:
a metrology tool; and
a controller communicatively coupled to the metrology tool, the controller including one or more processors configured to execute program instructions configured to cause the one or more processors to:
define a full sampling map including a plurality of measurement locations;
direct the metrology tool to measure alignment at each measurement location of the full sampling map for a plurality of samples to generate a reference alignment dataset, wherein a measured alignment is based on radiation emanating from a sample collected by a detector;
generate two or more candidate sampling maps, each of the two or more candidate sampling maps being a subset of the full sampling map;
define two or more candidate sampling map models to estimate alignment as a function of location based on the two or more candidate sampling maps;
calculate two or more estimated alignment datasets based on the two or more candidate sampling models, wherein the two or more estimated alignment datasets include estimates of alignment at the plurality of measurement locations of the full sampling map; and
determine a working sampling map from the two or more candidate sampling maps by comparing the two or more estimated alignment datasets to the reference alignment dataset, wherein the working sampling map includes a smallest number of alignment estimates exceeding a selected tolerance, wherein the selected tolerance comprises a first tolerance value including an absolute value difference between an estimated alignment and a reference alignment measurement along a first coordinate and a second tolerance value including an absolute value difference between an estimated alignment and a reference alignment measurement along a second coordinate.

2. The system of claim 1, wherein the one or more processors are further configured to execute program instructions configured to cause the one or more processors to direct the metrology tool to measure alignment of at least one additional sample at measurement locations defined by the working sample map.

3. The system of claim 1, wherein an alignment data point of the reference alignment dataset or the two or more estimated alignment datasets includes a vector representing an alignment error.

4. The system of claim 3, wherein the vector representing alignment error is provided with respect to the first coordinate and the second coordinate associated with a coordinate system.

5. The system of claim 4, wherein the coordinate system is a Cartesian coordinate system, wherein the first coordinate is an X coordinate, wherein the second coordinate is a Y coordinate.

6. The system of claim 4, wherein the coordinate system is a Polar coordinate system, wherein the first coordinate is a magnitude of the vector representing the alignment error, wherein the second coordinate is a polar angle.

7. The system of claim 4, wherein the selected tolerance comprises an absolute value difference between an estimated alignment and a reference alignment measurement along the first coordinate.

8. The system of claim 1, wherein the first tolerance value and the second tolerance value difference are equal.

9. The system of claim 1, wherein the first tolerance value is different than the second tolerance value difference.

10. The system of claim 1, wherein the two or more candidate sampling map models comprise:
at least one of a field-by-field alignment model or a composite field alignment model.

11. The system of claim 1, wherein an alignment data point of the reference alignment dataset comprises:
an alignment error of a sample in the metrology tool.

12. The system of claim 1, wherein an alignment data point of the reference alignment dataset comprises:
an overlay error of two or more layers of a sample measured by the metrology tool.

13. The system of claim 1, wherein the reference alignment dataset comprises:
at least one of a mean or a median of measured alignment data points at each measurement location of the full sampling map for the plurality of samples.

14. The system of claim 1, wherein the reference alignment dataset comprises:
at least one of a standard deviation or a variance of measured alignment data points at each measurement location of the full sampling map for the plurality of samples.

15. The system of claim 1, wherein the metrology tool comprises:
an illumination source configured to generate an illumination beam;
one or more illumination optical elements configured to direct a portion of the illumination beam to a sample;
the detector; and
one or more collection optical elements configured to direct radiation emanating from the sample to the detector.

16. A system comprising:
a controller communicatively coupled to a metrology tool, the controller including one or more processors configured to execute program instructions configured to cause the one or more processors to:
define a full sampling map including a plurality of measurement locations;
direct the metrology tool to measure alignment at each measurement location of the full sampling map for a plurality of samples to generate a reference alignment dataset, wherein a measured alignment is based on radiation emanating from a sample collected by a detector in response to illumination from an illumination source;
generate two or more candidate sampling maps, each of the two or more candidate sampling maps being a subset of the full sampling map;
define two or more candidate sampling map models to estimate alignment as a function of location based on the two or more candidate sampling maps;
calculate two or more estimated alignment datasets based on the two or more candidate sampling models, wherein the two or more estimated alignment datasets include estimates of alignment at the plurality of measurement locations of the full sampling map; and determine a working sampling map from the two or more candidate sampling maps by comparing the two or more estimated alignment datasets to the reference alignment dataset, wherein the working sampling map includes a smallest number of alignment estimates exceeding a selected tolerance, wherein the selected tolerance comprises a first tolerance value including an absolute value difference between an estimated alignment and a reference alignment measurement along a first coordinate and a second tolerance value including an absolute value difference between an estimated alignment and a reference alignment measurement along a second coordinate.

17. A system comprising:

a metrology tool; and a controller communicatively coupled to the metrology tool, the controller including one or more processors configured to execute program instructions configured to cause the one or more processors to:

define a full sampling map including a plurality of measurement locations;

direct the metrology tool to measure alignment at each measurement location of the full sampling map for a plurality of samples to generate a reference alignment dataset, wherein a measured alignment is based on radiation emanating from a sample collected by a detector;

define a reference sampling map model to estimate alignment as a function of location based on the reference alignment dataset;

calculate a reference alignment estimate dataset based on the reference alignment dataset, wherein the reference alignment estimate dataset includes estimates of alignment at two or more selected locations;

generate two or more candidate sampling maps, each of the two or more candidate sampling maps being a subset of the full sampling map;

define two or more candidate sampling map models to estimate alignment as a function of location based on the two or more candidate sampling maps;

calculate two or more estimated alignment datasets based on the two or more candidate sampling models, wherein the two or more estimated alignment datasets include estimates of alignment at the two or more selected locations; and determine a working sampling map from the two or more candidate sampling maps by comparing the two or more estimated alignment datasets to the reference alignment estimate dataset, wherein the working sampling map includes a smallest number of alignment estimates exceeding a selected tolerance, wherein the selected tolerance comprises a first tolerance value including an absolute value difference between an estimated alignment and a reference alignment measurement along a first coordinate and a second tolerance value including an absolute value difference between an estimated alignment and a reference alignment measurement along a second coordinate.

18. The system of claim 17, wherein each selected location of the two or more selected locations corresponds to a field on a sample.

19. The system of claim 18, wherein a number of selected locations is the same as a number of fields on a sample.

20. A method for selecting a sample map comprising:

defining a full sampling map including a plurality of measurement locations;

measuring alignment at each measurement location of the full sampling map for a plurality of samples to generate a reference alignment dataset;

generating two or more candidate sampling maps, each of the two or more candidate sampling maps being a subset of the full sampling map;

defining two or more candidate sampling map models to estimate alignment as a function of location based on the two or more candidate sampling maps;

calculating two or more estimated alignment datasets based on the two or more candidate sampling models, wherein the two or more estimated alignment datasets include estimates of alignment at the plurality of measurement locations of the full sampling map; and determining a working sampling map from the two or more candidate sampling maps by comparing the two or more estimated alignment datasets to the reference alignment dataset, wherein the working sampling map includes a smallest number of alignment estimates exceeding a selected tolerance, wherein the selected tolerance comprises a first tolerance value including an absolute value difference between an estimated alignment and a reference alignment measurement along a first coordinate and a second tolerance value including an absolute value difference between an estimated alignment and a reference alignment measurement along a second coordinate.

* * * * *